Figure 1:
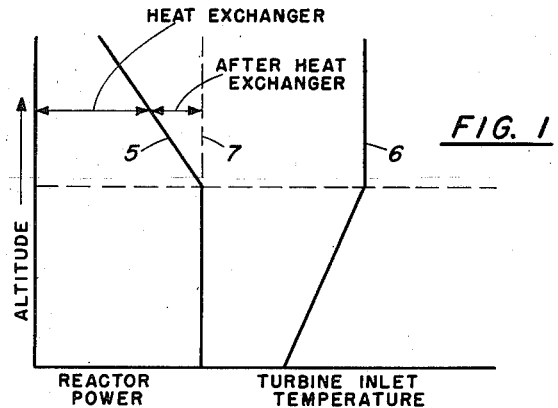

INVENTORS
ROBERT W. PINNES
CARMINE A. DE CRESCENTE

United States Patent Office 2,974,495
Patented Mar. 14, 1961

2,974,495

HEAT EXCHANGER ARRANGEMENT FOR MAXIMUM UTILIZATION OF REACTOR POWER FOR ALL ALTITUDE CONDITIONS

Robert W. Pinnes, Rockville, Md., and Carmine A. De Crescente, Levittown, Pa., assignors to the United States of America as represented by the Secretary of the Navy Filed Aug. 8, 1958, Ser. No. 754,115

5 Claims. (Cl. 60—59)

(Granted under Title 35, U.S. Code (1952), sec. 266)

The invention described herein may be manufactured and used by or for the Government of the United States of America for governmental purposes without the payment of any royalties thereon or therefor.

This invention relates generally to the field of aircraft nuclear propulsion and more particularly to the maximum utilization of the available reactor power for all flight conditions.

At the present time, the successful employment of a reactor-engine combination has two major limiting factors; the reactor power output and the temperature in the system. At high altitudes, temperature is the more critical limitation necessitating reduction of the reactor power output below the maximum to thereby reduce the turbine inlet temperature to a safe value.

Of course, operation at less than full reactor power in keeping with the dictates of turbine inlet temperature limitations is disadvantageous for such operation prevents the maximum use of the power available from nuclear fuel. In other words, when the reactor is cut back from full power output, a percentage of the potential output is unavailable to yield thrust from the turbojet. To make this power available the total heat generated in the reactor must be passed to the motive fluid passing through the turbo-jet. This can be accomplished by heating the motive fluid passing into the turbine to the maximum allowable turbine inlet temperature with part of the reactor power output and reheating the motive fluid with the balance of the reactor output at some point downstream of the turbine.

An outstanding object of the invention therefore is to provide means for operating a conventional aircraft nuclear propulsion engine at full reactor power at all flight altitudes.

A more specific object of the invention is to provide secondary heat exchange means to which may be diverted all of the liquid metal from the reactor in excess of that employed in the primary heat exchanger to heat the turbine motive fluid to the maximum allowable inlet temperature.

An additional object is to provide means to utilize full reactor power to yield higher speed capabilities at high altitudes and to increase the flight ceiling.

Other objects and features will become apparent in the following description of the illustrated forms of the invention.

In the drawings:

Fig. 1 is a graphic representation of the behavior of reactor power output and turbine inlet temperature as a function of altitude.

Figure 2:
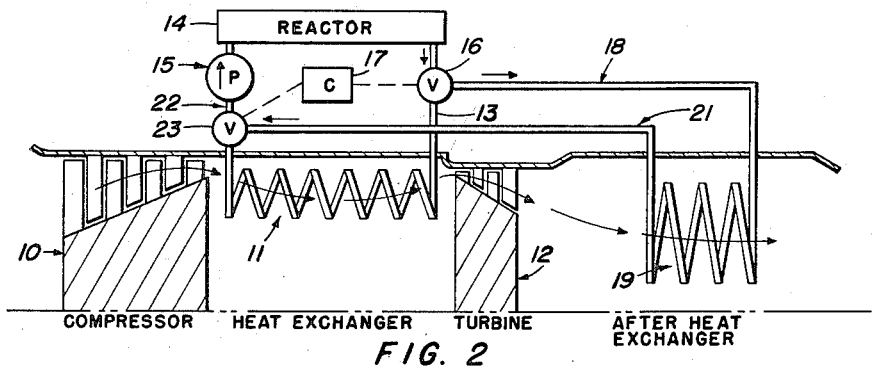
Figure 3:
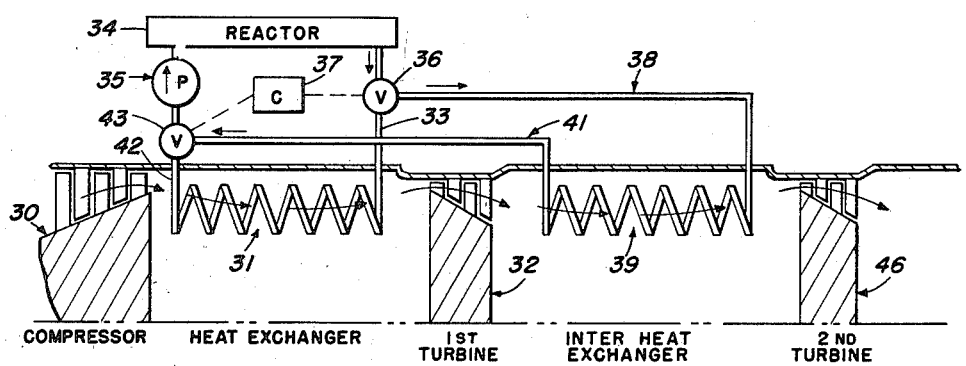

Fig. 2 shows diagrammatically the preferred valving and piping arrangement for diverting liquid metal from the line connecting the reactor with the primary heat exchanger and back to the return line connecting the primary heat exchanger with the reactor, and Fig. 3 shows an alternate arrangement differing from Fig. 2 insofar as the manner of utilization of the heat from the diverted liquid metal The effects of the two limiting factors, reactor power output and turbine inlet temperature are graphically illustrated in Fig. 1. At low altitudes where the density of the air utilized by the turbine as working fluid is relatively high, the turbines are capable of absorbing all the reactor power available. In fact, at low altitudes with all engines operating, the turbine inlet temperature may be quite low. In such a case it may be desirable to operate on part engines. Thus, it may be said that at low altitudes reactor power output is the limiting factor. However, as there is an increase in altitude and the air becomes less dense, the same reactor power level can produce a higher turbine inlet temperature. When an altitude is finally attained at which the maximum allowable temperature is reached at the turbine inlet, or elsewhere in the system, any further increase in altitude will mean that reactor power must be reduced in keeping with the temperature limitation. Thus, in a conventional aircraft nuclear propulsion engine with increase beyond this critical altitude, in order to keep the turbine inlet temperature constant, there must be a commensurate cutback in reactor power (shown by solid lines 5 and 6). In contrast to the conventional arrangement, the system proposed herein utilizes a secondary heat exchanger connected in parallel to the conventional primary heat exchanger and permits operation of the reactor at full rated power at all altitudes (shown by dotted line 7). This full rated power output as represented by the flow of liquid metal from the reactor at any altitude is at all times the sum of the power conducted to the primary heat exchanger plus the power diverted to the secondary heat exchanger.

Fig. 2 is illustrative of the preferred embodiment of the proposed system. The engine retains all the basic features of the conventional aircraft nuclear propulsion engine; i.e. compressor 10, primary heat exchanger 11, and turbine 12 to run compressor 10. The primary heat exchanger 11 shown schematically will usually have finned tubes to increase heat transfer and may or may not employ chemical interburning. In the liquid metal line 13 from the reactor 14 valve 16 has been inserted. Pump 15 is shown to force the liquid metal through reactor 14 and through the associated system therefor. Valve 16 can be controlled by a suitable temperature or altitude sensing device 17 to divert the flow of liquid metal from the liquid metal line 13 to liquid metal line 18 whereby the flow of liquid metal to primary heat exchanger 11 can be shunted to secondary (or after) heat exchanger 19 shown aft of turbine 12. In order to complete the flow circuit through the after heat exchanger 19, line 21 serves to conduct the liquid metal back to the return line 22 leading from primary heat exchanger 11 to reactor 14. At this point a valve 23 may be inserted mutually controlled with valve 16 by sensing device 17.

The operation of the system in the low altitude region is the same as that currently employed in conventional aircraft nuclear propulsion engines. Valves 16 and 23 would be set to permit full flow through lines 13 and 22 to and from primary heat exchanger 11. Thus, no flow would pass through line 18. However, as altitude is increased, the temperature limitation is reached. At this point, valves 16 and 23 giving access to the heat exchanger 19 start to open, bypassing some of the liquid metal to the after heat exchanger 19 permitting circulation therethrough and back to return line 22. Operation of valves 16 and 23 can be controlled by a suitable temperature sensing device 17, well-known in the art, or by any other suitable device. Air flow through the compressor 10, over primary heat exchanger 11, through turbine 12 and over after heat exchanger 19 is indicated by arrows. The reactor 14 continues to develop its full rated power at all altitudes with valves 16 and 23 bypassing more or less liquid metal through the after heat exchanger 19 as the altitude of the aircraft is increased above or decreased to the critical altitude. Although flow of the liquid metal through the heat exchangers can be parallel to the flow of motive air, counterflow (as indicated by the arrows along the liquid metal lines) permits use of a lower reactor temperature and is preferred.

In this manner the primary heat exchanger 11 absorbs power up to the amount allowed by the temperature limitations (for example, the turbine inlet temperature) while the excess power beyond this amount will be absorbed by the motive fluid leaving turbine 12 and passing out the tailpipe, meanwhile adding to the speed capability and increasing the ceiling of the craft. After heat exchanger 19 may be used in combination with conventional chemical after burning analogous to the use of chemical interburning in combination with the primary heat exchanger 11.

In the alternate arrangement shown in Fig. 3, the system is shown applied to a multiple turbine installation. Such an arrangement could also be applied between stages of a single turbine. Secondary (or inter) heat exchanger 39 is located in the path of the motive fluid passing from first turbine 32 to second turbine 46. The operation of the system is substantially as described in connection with the preferred embodiment shown in Fig. 2 with the motive fluid being reheated by the bypassed liquid metal in inter heat exchanger 39 before entering the second turbine 46. Like reference characters designate parts corresponding to those shown in Fig. 2.

The arrangement in Fig. 3 can be extended, of course, to be adapted to any number of turbines. Although not indicated on the drawing each heat exchanger may be used in combination with chemical interburning or afterburning as the case may be.

Obviously many modifications and variations of the present invention are possible in the light of the above teachings. It is therefore to be understood that within the scope of the appended claims the invention may be practiced otherwise than as specifically described.

What is claimed is:

1. In a reactor-engine combination for aircraft nuclear propulsion; a reactor, a turbine, first circuit means connected to said reactor and located in the path of motive fluid directed toward said turbine for the purpose of heating said motive fluid prior to passing into said turbine, said first circuit means circulating molten metal carried from and returned to said reactor, said circuit means connected to said first circuit means and located in the path of the motive fluid efflux from said turbine for the purpose of heating said motive fluid efflux, said first and second circuit means being connected in parallel and means common to both circuit means for initiating and varying the flow of said molten metal to said second circuit means by by-passing said first circuit means whereby said reactor may develop full rated power at all altitudes without exceeding the temperature limitation of the system.

2. In a reactor-engine combination for aircraft nuclear propulsion; a reactor, a turbine, first heating means connected to said reactor by primary conduits and located in the path of motive fluid directed toward said turbine for the purpose of heating said motive fluid inflow to said turbine, said first heating means circulating liquid metal carried from and returned to said reactor through said primary conduits, second heating means connected to said first heating means and located in the path of the fluid efflux from said turbine to heat said efflux, said first and second heating means being connected in parallel by means of secondary conduits connected to said primary conduits and means common to both the primary and secondary conduits for initiating and varying the flow of said liquid metal from said reactor to said second heating means by bypassing said first heating means whereby it is made possible to operate said reactor at full rated power at all altitudes.

3. The reactor-engine combination as claimed in claim 2 wherein said means for initiating and varying the flow of liquid metal to the second heating means comprises valve means and automatic control means for said valve means.

4. A reactor-engine combination for aircraft nuclear propulsion comprising in combination; a reactor, a turbine, circuit means including primary heat transfer means connected to said reactor and located in the path of motive fluid directed toward said turbine to heat said motive fluid, secondary heat transfer means also connected to said circuit means, and altitude responsive means to initiate and vary the flow of heat transmitting material from the reactor to the secondary heat exchanger by bypassing the primary heat exchanger thereby permitting utilization of full rated power output from said reactor at any altitude without exceeding the maximum allowable inlet temperature of said turbine.

5. A reactor-engine combination for aircraft nuclear propulsion comprising; a reactor, a turbine, a primary heat exchanger placed in advance of the turbine for heating the motive fluid flowing to the turbine, first conduit means connecting said primary heat exchanger and said reactor, a secondary heat exchanger placed after the turbine for heating the motive fluid leaving the turbine, second conduit means connected in parallel with said first conduit means for connecting the secondary heat exchanger to the reactor, and altitude responsive means located at the junction of said first and second conduit means, said altitude responsive means being used to initiate and vary the flow of heat transmitting material form the reactor to the secondary heat exchanger by bypassing the primary heat exchanger thereby permitting the reactor to develop full rated power at all altitudes without exceeding the temperature limitations of the system.

References Cited in the file of this patent

UNITED STATES PATENTS

| 2,621,481 | Bowden | Dec. 16, 1952 |
| 2,767,549 | Martin | Oct. 23, 1956 |
| 2,836,197 | Johnson | May 27, 1958 |
| 2,865,827 | Dwyer | Dec. 23, 1958 |

FOREIGN PATENTS

| 628,366 | Great Britain | Aug. 26, 1949 |
| 751,313 | Great Britain | June 27, 1956 |
| 754,559 | Great Britain | Aug. 8, 1956 |
| 772,287 | Great Britain | Apr. 10, 1957 |
| 251,748 | Switzerland | Aug. 16, 1948 |